United States Patent
Kim et al.

(10) Patent No.: US 9,618,808 B2
(45) Date of Patent: Apr. 11, 2017

(54) LIQUID CRYSTAL DISPLAY

(71) Applicant: Samsung Display Co., Ltd., Yongin (KR)

(72) Inventors: Hoon Kim, Ansan-si (KR); Ki Chul Shin, Seongnam-si (KR); Dan Bi Yang, Gunpo-si (KR); Ji Phyo Hong, Pyeongtaek-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/326,107

(22) Filed: Jul. 8, 2014

(65) Prior Publication Data

US 2015/0042917 A1 Feb. 12, 2015

(30) Foreign Application Priority Data

Aug. 6, 2013 (KR) .................. 10-2013-0093233

(51) Int. Cl.
*G02F 1/1337* (2006.01)
*G02F 1/1343* (2006.01)

(52) U.S. Cl.
CPC .. *G02F 1/134336* (2013.01); *G02F 1/133707* (2013.01); *G02F 1/1343* (2013.01); *G02F 2001/134345* (2013.01); *G02F 2001/134354* (2013.01)

(58) Field of Classification Search
CPC .......................................... G02F 2001/134345
See application file for complete search history.

(56) References Cited

U.S. PATENT DOCUMENTS

| 7,474,292 B2 | 1/2009 | Kamada et al. |
| 8,294,860 B2 | 10/2012 | Yoshida et al. |
| 8,379,176 B2 | 2/2013 | Kim et al. |
| 2002/0105614 A1* | 8/2002 | Nakayama ........ G02F 1/136213 349/143 |
| 2009/0073367 A1* | 3/2009 | Woo et al. ..................... 349/142 |
| 2009/0161055 A1* | 6/2009 | Huang .............. G02F 1/134309 349/129 |
| 2012/0162559 A1* | 6/2012 | Kim .................. G02F 1/134363 349/42 |
| 2012/0224128 A1 | 9/2012 | Jung et al. |
| 2014/0211142 A1 | 7/2014 | Kim et al. |

FOREIGN PATENT DOCUMENTS

| CN | 103969895 | 8/2014 |
| EP | 2762965 | 8/2014 |
| JP | 2014-149524 | 8/2014 |
| KR | 10-2003-0061584 | 7/2003 |
| KR | 10-2008-0084196 | 9/2008 |
| KR | 10-2010-0078308 | 7/2010 |
| KR | 10-2012-0074967 | 7/2012 |
| KR | 10-2014-0097905 | 8/2014 |

* cited by examiner

*Primary Examiner* — Wen-Ying P Chen
(74) *Attorney, Agent, or Firm* — H.C. Park & Associates, PLC (57) ABSTRACT

A liquid crystal display includes: a first subpixel electrode disposed on a first substrate; an insulating layer disposed on the first subpixel electrode; a second subpixel electrode disposed on the insulating layer; and a common electrode disposed on a second substrate, the second substrate facing the first substrate. The first subpixel electrode is overlapped with a portion of the second subpixel electrode, and the first subpixel electrode and the second subpixel electrode are configured to receive substantially the same electric potential.

14 Claims, 7 Drawing Sheets

LIQUID CRYSTAL DISPLAY

CROSS-REFERENCE TO RELATED APPLICATIONS

This application claims priority from and the benefit of Korean Patent Application No. 10-2013-0093233, filed on Aug. 6, 2013, which is incorporated herein by reference for all purposes as if fully set forth herein.

BACKGROUND

Field

The present disclosure relates to a liquid crystal display.

Discussion of the Background

A liquid crystal display is one of the most common types of flat panel displays currently in use, and generally includes two sheets of display panels with field generating electrodes, such as a pixel electrode and a common electrode, and a liquid crystal layer interposed therebetween.

The liquid crystal display generates an electric field in the liquid crystal layer by applying a voltage to the field generating electrodes, determines the direction of liquid crystal molecules of the liquid crystal layer by the generated electric field, and controls polarization of incident light, thereby displaying images.

Further, the liquid crystal display includes a switching element connected to each pixel electrode, and a plurality of signal lines, such as a gate line and a data line, for applying a voltage to the pixel electrode by controlling the switching element.

Among the liquid crystal displays, a vertically aligned (VA) mode liquid crystal display, in which long axes of liquid crystal molecules are aligned to be vertical to the display panels without applying the electric field, has been widely adopted due to a large contrast and a wide reference viewing angle. Here, the reference viewing angle refers to a viewing angle in which a contrast ratio is 1:10 or a luminance inversion limit angle between grays.

In order to improve side visibility of a liquid crystal display close to front visibility for the vertically aligned mode liquid crystal display, a method of varying transmittance has been proposed by dividing one pixel into two subpixels located in separate regions of a display plane, respectively, and applying different voltages to the two subpixels.

Although side visibility may be improved and be close to front visibility by to dividing one pixel into two subpixels and varying transmittance, however, such a configuration has some defects because the transmittance is reduced due to a distance between the two subpixels.

Furthermore, when a high-resolution liquid crystal display is driven at a low frequency, a flicker and the like according to a kickback voltage of the liquid crystal display are easily recognized in comparison with the high-resolution liquid crystal display driven at a high frequency.

The above information disclosed in this Background section is only for enhancement of understanding of the background of the invention and therefore it may contain information that does not form any part of the prior art that is already known in this country to a person of ordinary skill in the art.

SUMMARY

Exemplary embodiments of the present invention provide a liquid crystal display having advantages of preventing or reducing deterioration of transmittance and deterioration of display quality according to a kick-back voltage while maintaining or improving side visibility close to front visibility.

Additional aspects will be set forth in part in the description which follows and, in part, will be apparent from the description, or may be learned by practice of the presented embodiments.

According to an exemplary embodiment, a liquid crystal display includes a first subpixel electrode disposed on a first substrate; an insulating layer disposed on the first subpixel electrode; a second subpixel electrode disposed on the insulating layer; and a common electrode disposed on a second substrate, the second substrate facing the first substrate. The first subpixel electrode is overlapped with a portion of the second subpixel electrode, and the first subpixel electrode and the second subpixel electrode are configured to receive substantially the same electric potential.

According to an exemplary embodiment, a liquid crystal display, including: a liquid crystal layer; a pixel electrode including a first subpixel electrode and a second subpixel electrode, the first subpixel electrode being overlapped with a portion of the second subpixel electrode in a first region of a pixel; and a common electrode, the common electrode being configured to form an electric field, in the liquid crystal layer, in association with the pixel electrode.

According to an exemplary embodiment, a liquid crystal display, including: a liquid crystal layer; a pixel electrode including a first subpixel electrode and a second subpixel electrode; and a common electrode, the common electrode being configured to form an electric field, in the liquid crystal layer, in association with the pixel electrode. A pixel of the liquid crystal display includes a first region and a second region. The first region is configured to form a first electric field, the second region is configured to form a second electric field, and an intensity of the first electric field exceeds an intensity of the second electric field.

It is to be understood that both the foregoing general description and the following detailed description are exemplary and explanatory and are intended to provide further explanation of the invention as claimed.

BRIEF DESCRIPTION OF HE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Exemplary embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

The embodiments described hereinafter are exemplary, and various changes and modifications may be made. Further, when a layer is referred to as being "on" another layer or substrate, it may be directly on the other layer or substrate, or one or more intervening layers may also be present therebetween. Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms "a", "an", and "the" are intended to include the plural forms as well, unless the context clearly indicates otherwise. It will be further understood that the terms "comprises," "includes," "including," and/or "comprising," when used herein, specify the presence of stated features, components, groups, elements, steps, operations, and/or devices thereof but do not preclude the presence or addition of one or more other features, components, groups, elements, steps, operations, and/or devices thereof. Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure. Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Figure 1:
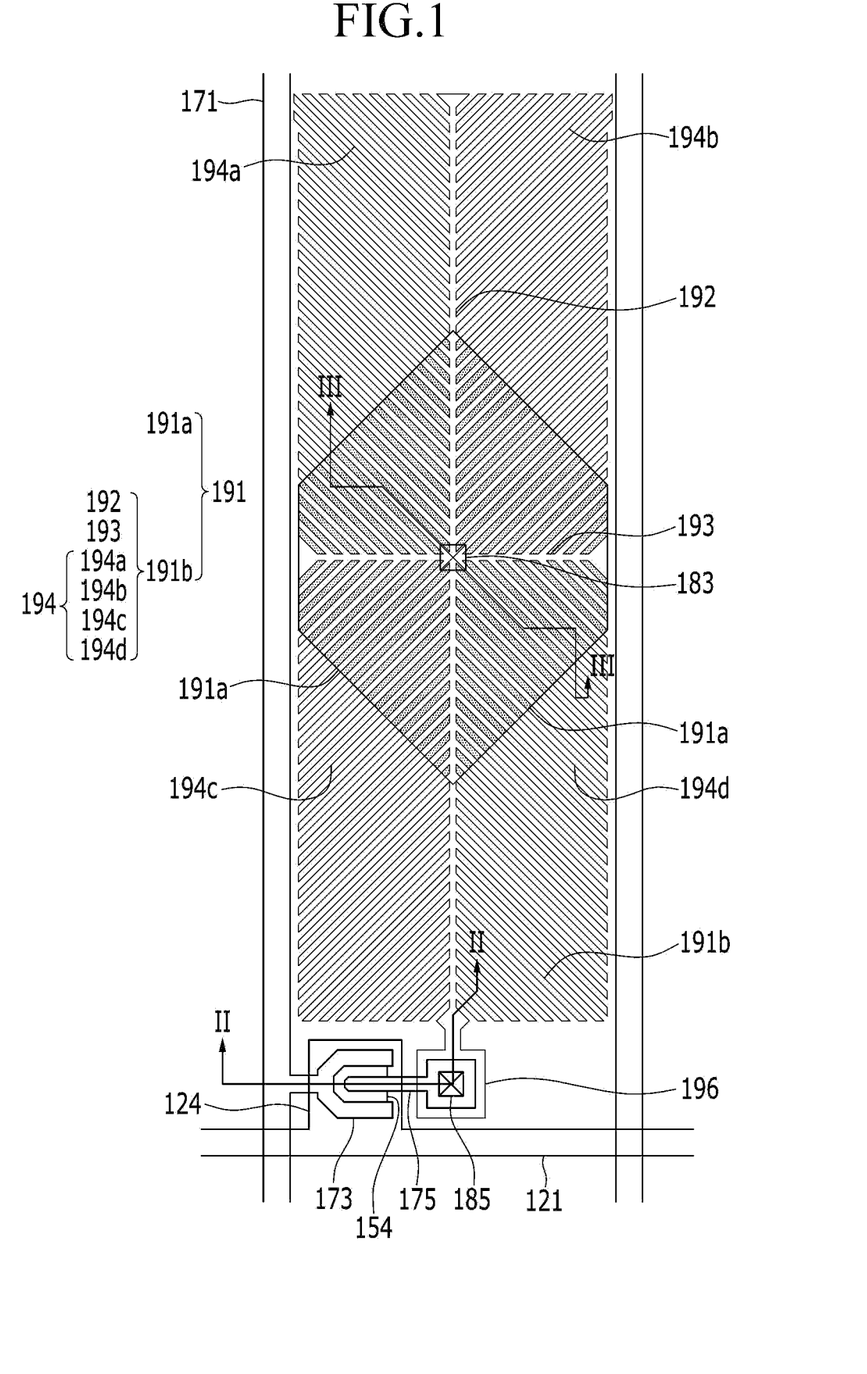
FIG. 1 is a layout view illustrating a liquid crystal display according to an exemplary embodiment of the present invention.

A liquid crystal display according to an exemplary embodiment of the present invention will be described with reference to FIG. 1, FIG. 2, and FIG. 3. FIG. 1 is a view illustrating the liquid crystal display according to an exemplary embodiment of the present invention, FIG. 2 is a cross-sectional view of the liquid crystal display of FIG. 1 taken along line II-II, and FIG. 3 is a cross-sectional view of the liquid crystal display of FIG. 1 taken along line III-III.

Figure 2:
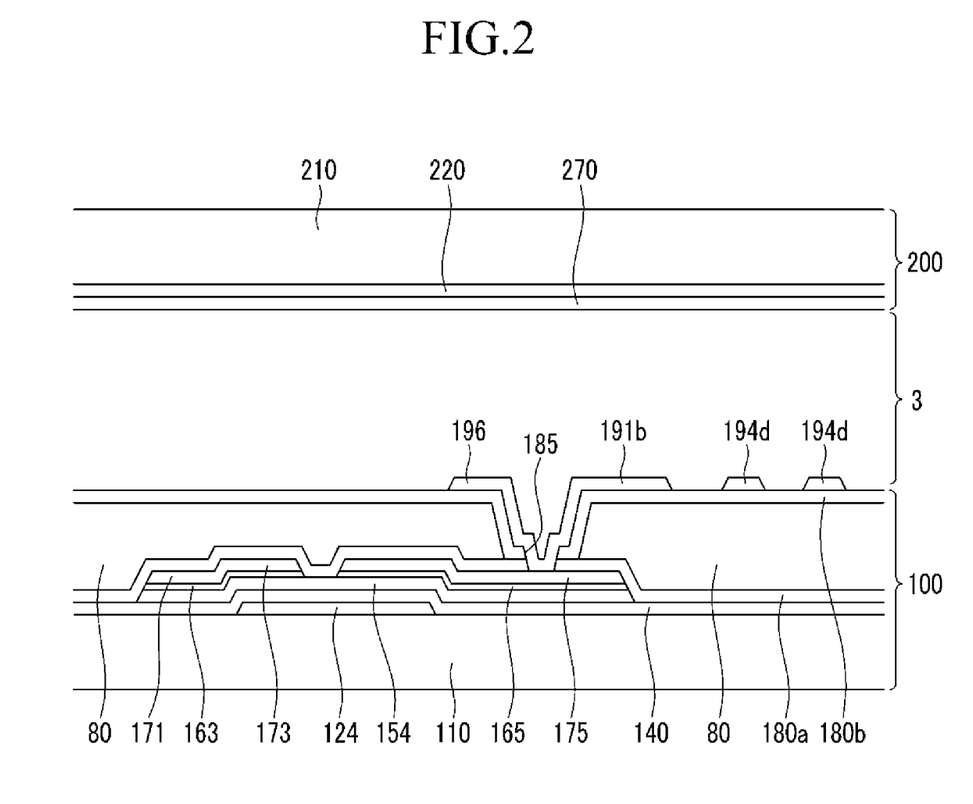
FIG. 2 is a cross-sectional view of the liquid crystal display of FIG. 1 taken along line II-II according to an exemplary embodiment of the present invention.
Figure 3:
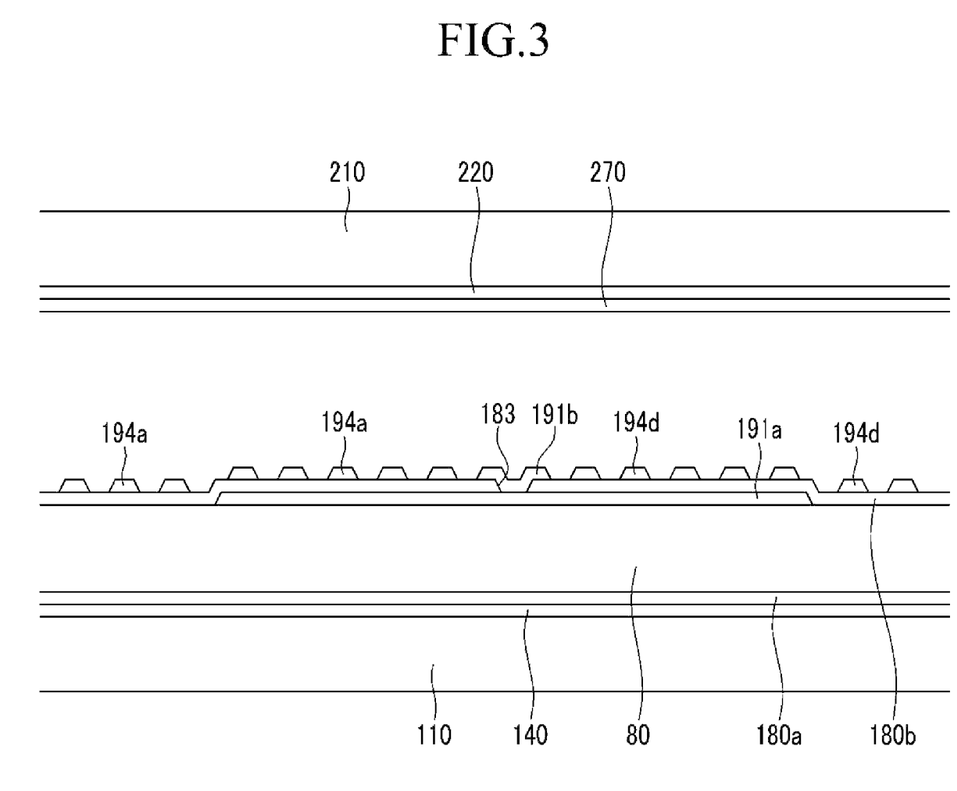
FIG. 3 is a cross-sectional view of the liquid crystal display of FIG. 1 taken along line III-III according to an exemplary embodiment of the present invention.

Referring to FIG. 1 to FIG. 3, a liquid crystal display may include a lower panel 100 and an upper panel 200 facing each other, and a liquid crystal layer 3 disposed between the two panels 100 and 200.

The lower panel 100 will be described in more detail.

A gate line 121 is formed on a first insulation substrate 110 made of transparent glass, plastic, or the like.

The gate line 121 includes a gate electrode 124, and a wide gate pad portion (not illustrated) for connection with another layer or an external driving circuit.

Although not illustrated, the liquid crystal display may further include a storage voltage line formed on the same layer on which the gate line 121 is formed.

A gate insulating layer 140 is formed on the gate line 121.

A semiconductor 154 which may be made of amorphous or crystalline silicon or the like is formed on a portion of the gate insulating layer 140. The semiconductor 154 may include an oxide semiconductor.

A plurality of ohmic contacts 163 and 165 are formed on the semiconductor 154. The ohmic contacts may be omitted in other configurations. For example, if the semiconductor 154 includes the oxide semiconductor, the ohmic contacts may be omitted.

A data line 171 and a drain electrode 175 are formed on the ohmic contacts 163 and 165 and the gate insulating layer 140.

The data line 171 includes a source electrode 173, and a wide data pad portion (not illustrated) for connection with another layer or an external driving circuit.

The gate electrode 124, the source electrode 173, and the drain electrode 175 form a thin film transistor together with the semiconductor 154, and a channel of the thin film transistor is formed in the semiconductor 154 between the source electrode 173 and the drain electrode 175.

A first passivation layer 180a made of an inorganic insulator, such as silicon nitride or silicon oxide, is formed on the data line 171 and the drain electrode 175.

An organic layer 80 is formed on the first passivation layer 180a. The organic layer 80 may include a color filter. The color filter may uniquely display one of the primary colors, and an example of the primary colors may include three primary colors, red, green, and blue, or colors, such as yellow, cyan, magenta, and the like.

If the organic layer 80 includes the color filter, an additional overcoat may be formed on the color filter. The overcoat prevents or reduces a component of the color filter from diffusing into the pixel electrode or the liquid crystal layer formed thereon.

A first subpixel electrode 191a is formed on the organic layer 80. A second passivation layer 180b is formed on the first subpixel electrode 191a. The second passivation layer 180b may be made of an inorganic insulator, such as silicon nitride or silicon oxide.

A second subpixel electrode 191b is formed on the second passivation layer 180b. The pixel electrode 191 may be made of a transparent conductive material, such as indium tin oxide (ITO), indium zinc oxide (IZO), or the like.

The first subpixel electrode 191a and a portion of the second subpixel electrode 191b are overlapped with each other with the second passivation layer 180b therebetween. However, a portion of the first subpixel electrode 191a may not be overlapped with the second subpixel electrode 191b while the other portion of the first subpixel electrode 191a is overlapped with the second subpixel electrode 191b. The first subpixel electrode 191a may be disposed at a portion of the pixel area, and the second subpixel electrode 191b may be formed throughout the pixel area. Accordingly, the first subpixel electrode 191a may be overlapped with a portion of the second subpixel electrode 191b. More specifically, the first subpixel electrode 191a may have a planar shape of which size corresponding to a portion of a region corresponding to the second subpixel electrode 191b.

The first subpixel electrode 191a may be a plate form having a hexagonal planar shape. The plate has a plate shape that is not divided but provided as one whole plate. The planar shape of the first subpixel electrode 191a is not limited thereto, but may have a polygonal planar shape disposed in a portion of one pixel area. Further, the first subpixel electrode 191a may have a circular shape or an elliptical shape.

The second subpixel electrode 191b may have a micro-slit structure. For example, the second subpixel electrode 191b may include cross stems 192 and 193 configured by a vertical stem 192 and a horizontal stem 193, and a plurality of branch electrodes 194 extended from the stems 192 and 193. The branch electrodes 194 may extend in four different directions. The plurality of branch electrodes 194 includes a plurality of first branch electrodes 194a extending in an upper left direction from the stems 192 and 193, a plurality of second branch electrodes 194b extending in an upper right direction from the stems 192 and 193, a plurality of third branch electrodes 194c extending in a lower left direction from the stems 192 and 193, and a plurality of branch electrodes 194d extending in a lower right direction from the stems 192 and 193. As such, if the plurality of branch electrodes 194 extending in the different directions are formed, the liquid crystal molecules are tilted in a direction parallel to a longitudinal direction of the plurality of branch electrodes 194 due to an effect of a fringe field generated in edges of the plurality of branch electrodes 194. The branch electrodes 194 extending in the four different directions are formed in one pixel, and as a result, one pixel area includes four subregions having different longitudinal directions of the plurality of branch electrodes 194. However, the number of the different directions is not limited to four as illustrated above (e.g., there may be three stems and branch electrodes 194 may extend six different directions). According to aspects, in one pixel area, tilt directions of the liquid crystal molecules are approximately four directions, and four domains having different alignment directions of the liquid crystal molecules are formed in the liquid crystal layer 3. As such, a reference viewing angle of the liquid crystal display may be increased by varying the tilt directions of the liquid crystal molecules.

A portion of each of the plurality of branch electrodes 194 of the second subpixel electrode 191b of the pixel electrode 191 is overlapped with the first subpixel electrode 191a, and a portion of each of openings between the plurality of branch electrodes 194 of the second subpixel electrode 191b is overlapped with the first subpixel electrode 191a.

A first contact hole 183 exposing a portion of the first subpixel electrode 191a is formed in the second passivation layer 180b. The second subpixel electrode 191b and the first subpixel electrode 191a are physically and electrically connected to each other through the first contact hole 183. In a different configuration, the first contact hole 183 may not be formed and the second subpixel electrode 191b and the first subpixel electrode 191a may not be conductively connected with each other. Further, while applying a voltage to the second subpixel electrode 191b via the drain electrode 175, a voltage (e.g., a DC voltage) may be applied to the first subpixel electrode 191a such that various properties, e.g., storage capacitance, brightness, transmittance, and the like, may be controlled based on different voltage settings.

A second contact hole 185 exposing a portion of the drain electrode 175 is formed in the first passivation layer 180a, the organic layer 80, and the second passivation layer 180b such that the second subpixel electrode 191b is physically and electrically connected to the drain electrode 175 through the second contact hole 185 to receive a data voltage from the drain electrode 175. Through the electrical contact of the drain electrode 175 and the second subpixel electrode 191b and the electrical contact of the and the second subpixel electrode 191b and the first subpixel electrode 191a, the data voltage may be induced to the second subpixel electrode 191b and the first subpixel electrode 191a.

As described above, since the second subpixel electrode 191b and the first subpixel electrode 191a are physically and electrically connected to each other through the first contact hole 183, substantially the same electric potential is applied to the first subpixel electrode 191a and the second subpixel electrode 191b and substantially the same voltages are applied between the first subpixel electrode 191a and the common electrode 270 and between the second subpixel electrode 191b and the common electrode 270.

The upper panel 200 will be described in more detail.

A light blocking member 220 and a common electrode 270 may be formed on a second insulation substrate 210 made of transparent glass, plastic, or the like.

However, according to different aspects, the light blocking member 220 may be disposed on the lower panel 100, and the liquid crystal display may further include a color filter disposed on the upper panel 200.

Alignment layers (not illustrated) may be disposed on inner sides of the two panels 100 and 200, and may be vertical alignment layers.

Polarizers (not illustrated) may be provided on outer sides of the two panels 100 and 200, and transmission axes of the two polarizers may be formed perpendicular to each other, and one transmission axis thereof may be parallel to the gate line 121. The polarizer may be disposed only on the outer side of the panel 100 or may be disposed only on the outer side of the panel 200.

The liquid crystal layer 3 may have negative dielectric anisotropy, and the liquid crystal molecules of the liquid crystal layer 3 are aligned so that long axes thereof are vertical (e.g., perpendicular) to the surfaces of the two panels 100 and 200 without applying an electric field. Accordingly, incident light does not pass through an orthogonal polarizer but is blocked when the electric field is not applied.

At least one of the liquid crystal layer 3 and the alignment layer may include a photo-reactive material, e.g., reactive mesogen.

As described above, the pixel electrode 191 of the liquid crystal display includes the first subpixel electrode 191a having the plate shape, and the second subpixel electrode 191b including the plurality of branch electrodes, and a portion of the second subpixel electrode 191b is overlapped with the first subpixel electrode 191a. As such, the pixel electrode 191 includes the first subpixel electrode 191a having the plate shape, and the second subpixel electrode 191b including the plurality of branch electrodes, and a portion of the second subpixel electrode 191b is overlapped with the first subpixel electrode 191a, and as a result, transmittance of the liquid crystal display may be increased.

Figure 4:
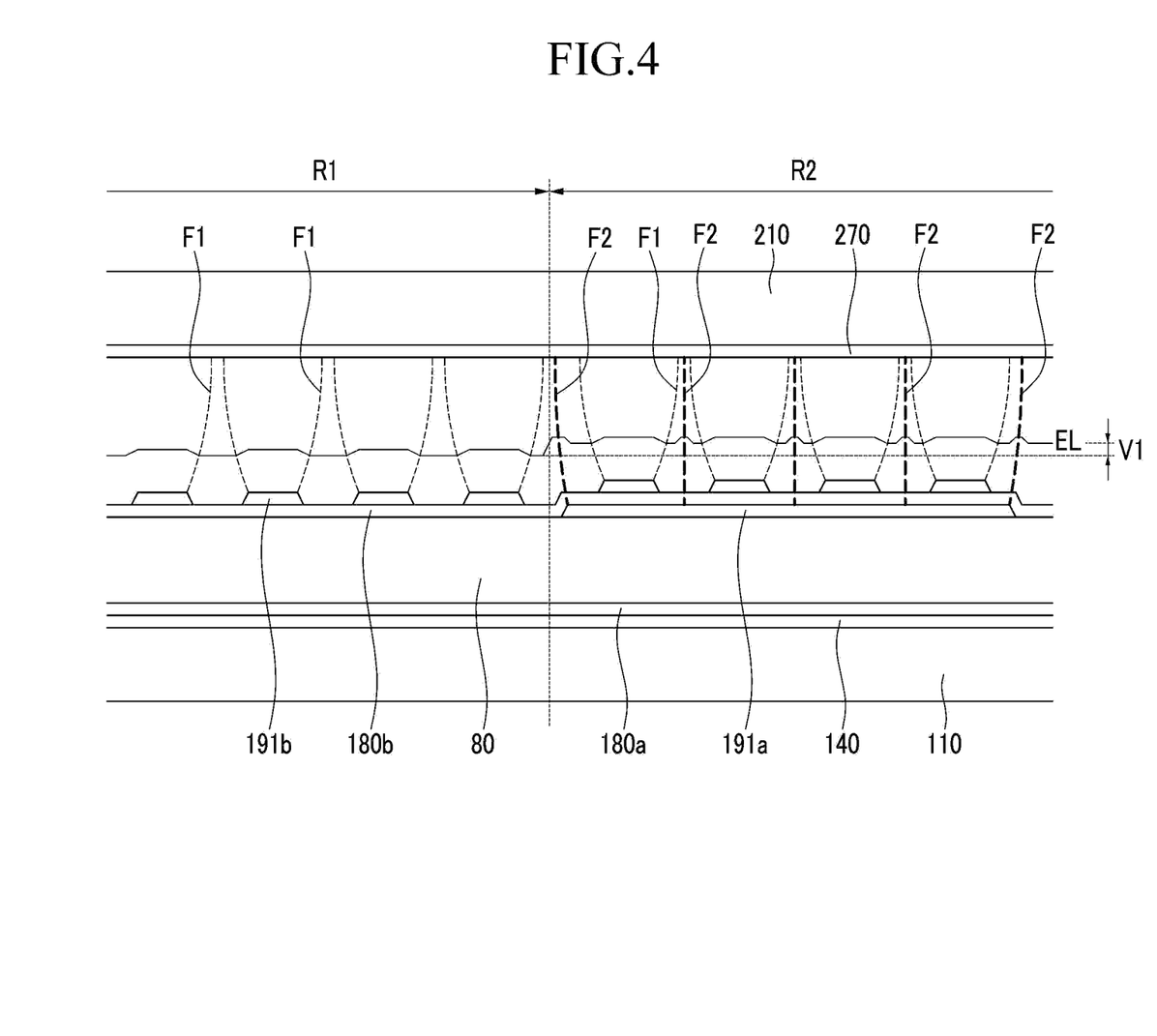
FIG. 4 is a schematic view for describing a magnitude of an electric field applied to a liquid crystal layer of one pixel area of a liquid crystal display according to an exemplary embodiment of the present invention.

A pixel area of the liquid crystal display will be described in more detail with reference to FIG. 4. FIG. 4 is a schematic view for describing a magnitude of an electric field applied to a liquid crystal layer of one pixel area of the liquid crystal display according to an exemplary embodiment of the present invention.

In the liquid crystal display, a portion of the second subpixel electrode 191b is overlapped with the first subpixel electrode 191a. More specifically, one pixel area includes a first region R1 in which the second subpixel electrode 191b is formed but the first subpixel electrode 191a is not formed, and a second region R2 in which both the first subpixel electrode 191a and the second subpixel electrode 191b are formed and overlapped with each other.

In the case of the first region R1, by a first electric field F1 formed between the second subpixel electrode 191b and the common electrode 270, the liquid crystal molecules of the liquid crystal layer 3 are aligned. In the case of the second region R2, together with the first electric field F1 formed between the second subpixel electrode 191b and the common electrode 270, by a second electric field F2 formed between the common electrode 270 and the first subpixel electrode 191a, which is partially overlapped with the openings formed between the plurality of branch electrodes 194 of the second subpixel electrode 191b, the liquid crystal molecules of the liquid crystal layer 3 are aligned. As illustrated by an equipotential line EL of FIG. 4, an intensity of the electric field applied to the liquid crystal layer of the second region R2 is larger than an intensity of the electric field applied to the liquid crystal layer of the first region R1.

As such, in the liquid crystal display, one pixel area includes the first region R1 and the second region R2 to which different magnitudes of electric fields are applied. Accordingly, the intensity of the electric field applied to the liquid crystal molecules corresponding to the first region R1 and the intensity of the electric field applied to the liquid crystal molecules corresponding to the second region R2 are different from each other, and as a result, tilt angles of the liquid crystal molecules in the first region R1 and the second region R2 may be different from each other and thus luminance in each region may vary. By dividing one pixel area into regions having different luminance values, the side visibility may become closer is to the front visibility. Further, since the same voltage is applied to the first pixel electrode 191a and the second pixel electrode 191b, the first pixel electrode 191a and the second pixel electrode 191b do not need to be separated and spaced apart from each other on a plane. Accordingly, while one pixel area is formed to have two regions to which electric fields having different magnitudes are applied, two pixel electrodes may be formed not to be spaced apart from each other on the same plane, thereby preventing or reducing deterioration of transmittance of the liquid crystal display according to a spaced portion of the two pixel electrodes.

Further, a liquid crystal capacitance of the liquid crystal display is increased by the overlapped portion of the first subpixel electrode 191a and the second subpixel electrode 191b, and, as a result, a magnitude of a kick-back voltage is decreased. The magnitude of the kick-back voltage is inversely proportional to the liquid crystal capacitance formed in the liquid crystal layer and a capacitance of the storage capacitor. In the second region R2 where the first subpixel electrode 191a and the second subpixel electrode 191b are overlapped with each other, by the electric field formed between the common electrode 270 and the first subpixel electrode 191a, which is facing the common electrode 270 through openings disposed between the plurality of branch electrodes 194 of the second subpixel electrode 191b, the liquid crystal capacitance formed in the liquid crystal is increased. Accordingly, in comparison with a configuration in which the first subpixel electrode 191a having a plate shape is not formed, the magnitude of the kick-back voltage is decreased further due to the first subpixel electrode 191a, and, as a result, it may be possible to prevent or reduce deterioration of display quality, such as a flicker generated due to the kick-back voltage.

Figure 5:
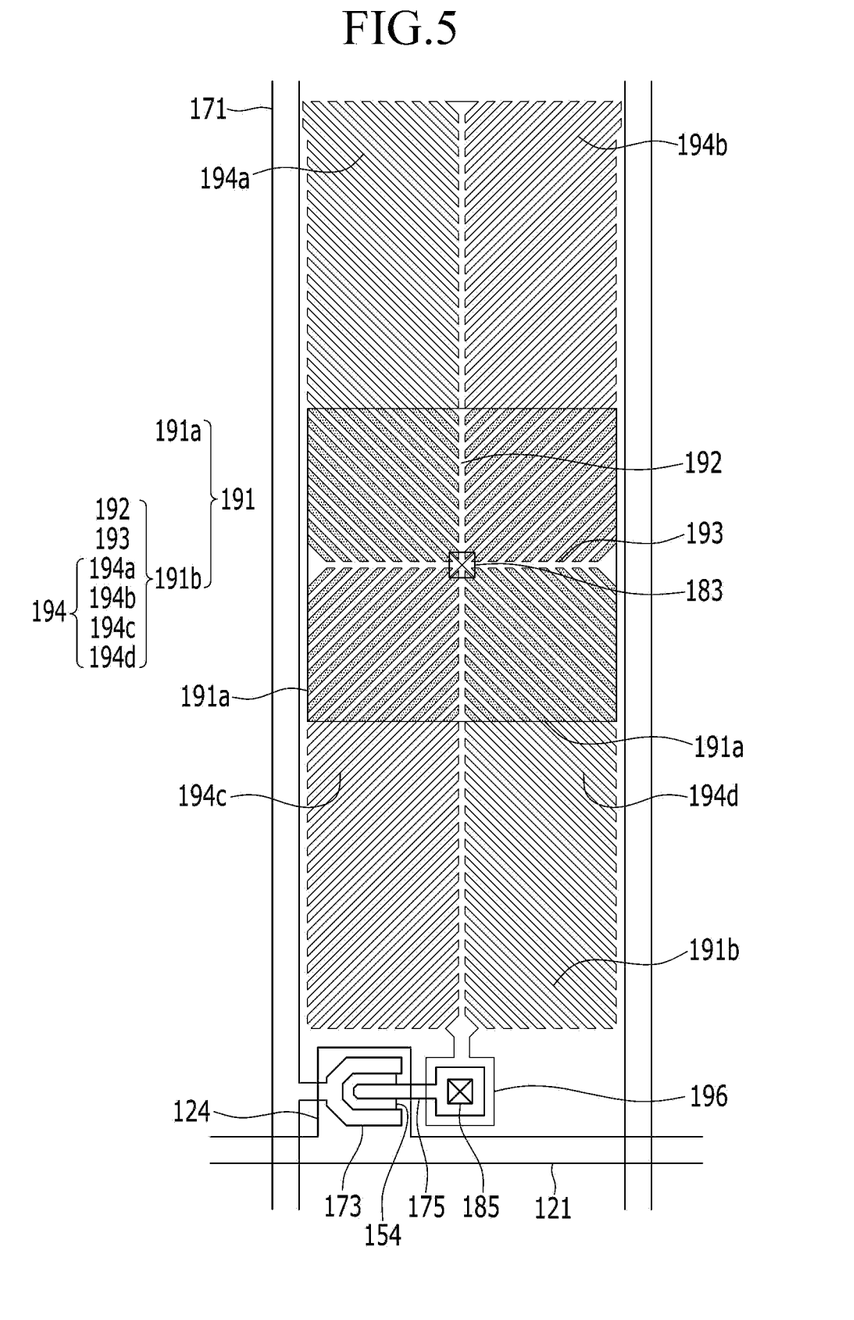
FIG. 5 is a layout view illustrating a liquid crystal display according to another exemplary embodiment of the present invention.

Hereinafter, a liquid crystal display according to another exemplary embodiment of the present invention will be described with reference to FIG. 5. FIG. 5 is a layout view illustrating a liquid crystal display according to an exemplary embodiment of the present invention.

Referring to FIG. 5, the liquid crystal display is similar to the liquid crystal display described with reference to FIG. 1 to FIG. 3.

However, unlike the liquid crystal display illustrated in FIG. 1, the first subpixel electrode 191a of the liquid crystal display has a quadrangular planar shape in FIG. 5, not the hexagonal planar shape in FIG. 1. The planar shape of the first subpixel electrode 191a is not limited thereto, but may have a polygonal planar shape disposed in a portion of one pixel area.

Figure 6:
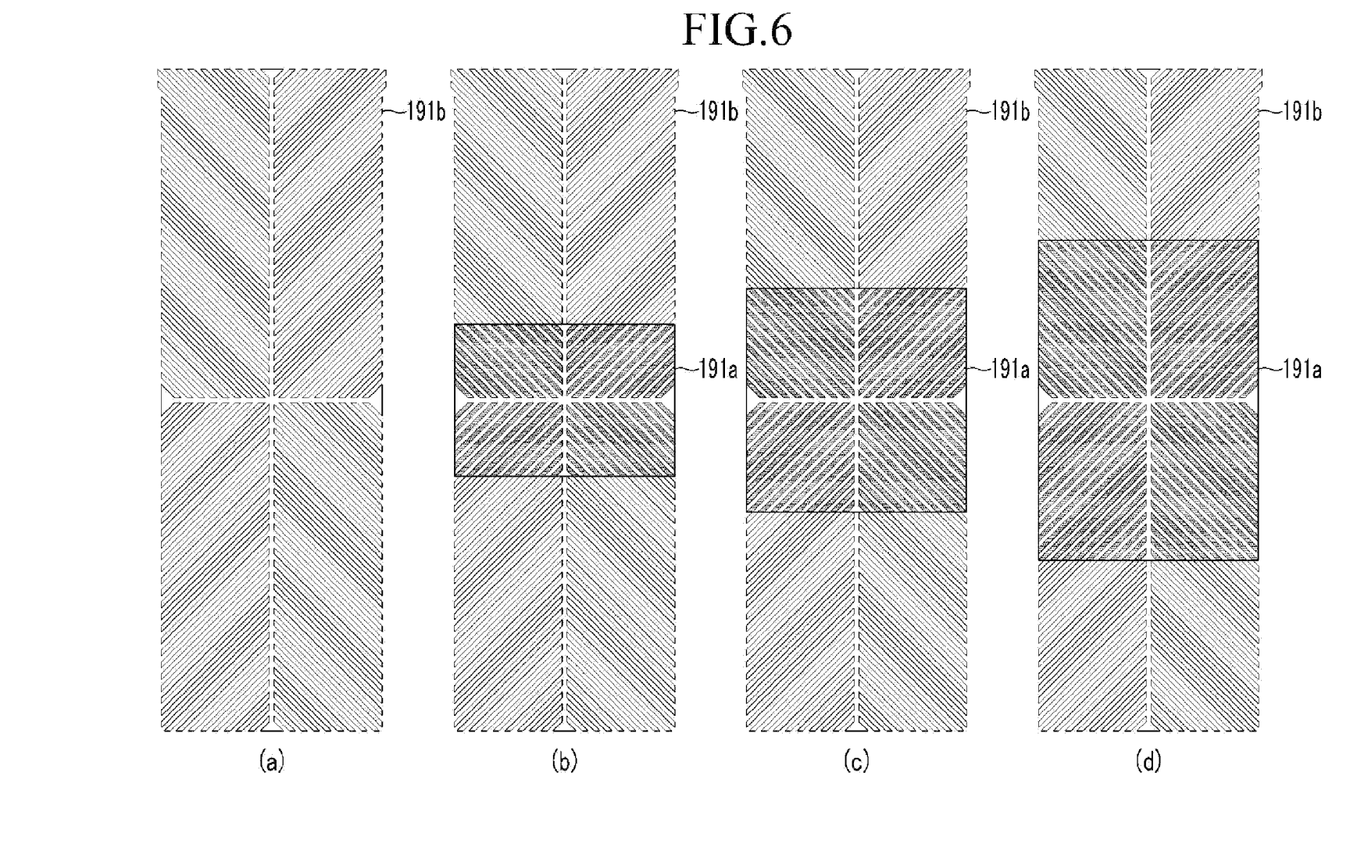
FIG. 6 is a diagram illustrating a result of an experimental example according to an exemplary embodiment of the present invention.
Figure 7:
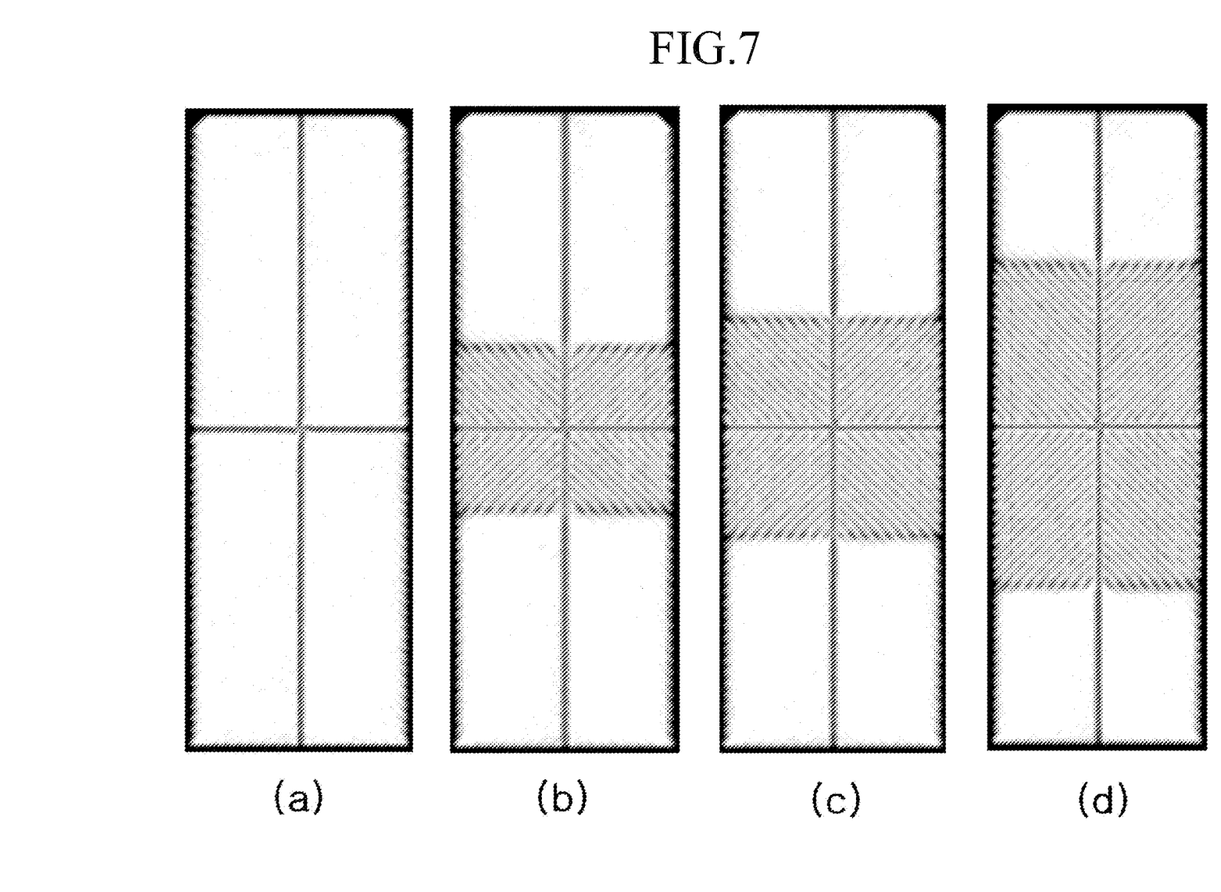
FIG. 7 is a diagram illustrating an electron micrograph result of an experimental example according to an exemplary embodiment of the present invention.

Many features of the liquid crystal display with reference to FIG. 1 to FIG. 4 may be applied to the liquid crystal display illustrated in FIG. 5, FIG. 6, and FIG. 7.

However, the liquid crystal display, the first subpixel electrode 191a may have various different planar shapes which are overlapped with a portion of the second subpixel electrode 191b.

An experimental example according to exemplary embodiments of the present invention will be described with reference to FIG. 6 and FIG. 7. FIG. 6 is a diagram illustrating a result of an experimental example according to an exemplary embodiment of the present invention. FIG. 7 is a diagram illustrating an electron micrograph result of an experimental example according to an exemplary embodiment of the present invention.

Different sizes of first subpixel electrode 191a and various shapes of pixel electrodes 191 are illustrated in FIG. 6. In the figure (a) of FIG. 6, the second subpixel electrode 191b including the plurality of branch electrodes 194 is formed without the first subpixel electrode 191a. In the figure (b) of FIG. 6, the first subpixel electrode 191a is overlapped with a region of about 25% of a region where the second subpixel electrode 191b including the plurality of branch electrodes 194 is occupied. In the figure (c) of FIG. 6, the first subpixel electrode 191a is overlapped with a region of about 33% of a region where the second subpixel electrode 191b including the plurality of branch electrodes 194 is occupied. In the figure (d) of FIG. 6, the first subpixel electrode 191a is overlapped with a region of about 50% of a region where the second subpixel electrode 191b including the plurality of branch electrodes 194 is occupied. Each result acquired by measuring a transmittance result of the liquid crystal display by an electron micrograph is illustrated in FIG. 7. Referring to FIG. 7, it was verified that deterioration of the transmittance is not significant even at a boundary of the overlapped portion of the first subpixel electrode 191a and the second subpixel electrode 191b, and the alignment of the liquid crystal is regular.

In the experimental example, capacitances of the liquid crystal capacitors of the respective cases are measured and compared with each other. In comparison with the first case (a), the capacitance of the liquid crystal capacitor of the second case (b) was increased by about three times, the capacitance of the liquid crystal capacitor of the third case (c) was increased by about four times, and the capacitance of the liquid crystal capacitor of the fourth case (d) was increased by about five times.

According to exemplary embodiments of the present invention, it may be possible to prevent or reduce deterioration of transmittance and deterioration of display quality according to a kick-back voltage while maintaining side visibility close to front visibility.

Although certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A liquid crystal display, comprising:
   a drain electrode disposed on a first substrate;
   a first subpixel electrode disposed on the first substrate, the first subpixel electrode not overlapping with the drain electrode;
   an insulating layer disposed on the first subpixel electrode;
   a second subpixel electrode disposed on the insulating layer, the second subpixel electrode being connected to the drain electrode, the second subpixel electrode comprising:
      a plurality of branch electrodes; and
      a connection region where the second subpixel electrode is connected with the first subpixel electrode; and
   a common electrode disposed on a second substrate, the second substrate facing the first substrate,
   wherein the connection region of the second subpixel electrode is spaced apart from the drain electrode and disposed at a central region of the second subpixel electrode, the central region being closer to a center of the second subpixel electrode than edges of the second subpixel electrode, and
   wherein, in a plan view, the first subpixel electrode overlaps with less than all of the second subpixel electrode.

2. The liquid crystal display of claim 1, wherein:
   the first subpixel electrode has a planar plate shape.

3. The liquid crystal display of claim 2, wherein, in the plan view:
   the first subpixel electrode overlaps with a portion of the plurality of branch electrodes, and overlaps with a portion of openings between the plurality of branch electrodes; and
   the plurality of branch electrodes extend beyond the first subpixel electrode.

4. The liquid crystal display of claim 1, wherein:
   the first subpixel electrode has a polygonal shape.

5. The liquid crystal display of claim 4, wherein:
   the first subpixel electrode and the second subpixel electrode are connected to each other through a contact hole in the insulating layer.

6. The liquid crystal display of claim 5, further comprising:
   a gate line and a data line disposed on the first substrate; and
   a thin film transistor connected to the gate line and the data line,
   wherein the second subpixel electrode is connected to the thin film transistor via the drain electrode.

7. The liquid crystal display of claim 1, wherein:
   the first subpixel electrode and the second subpixel electrode are connected to each other through a contact hole in the insulating layer.

8. The liquid crystal display of claim 7, further comprising:
   a gate line and a data line disposed on the first substrate; and
   a thin film transistor connected to the gate line and the data line,
   wherein the second subpixel electrode is connected to the thin film transistor via the drain electrode.

9. The liquid crystal display of claim 1, further comprising:
   a gate line and a data line disposed on the first substrate; and
   a thin film transistor connected to the gate line and the data line,
   wherein the second subpixel electrode is connected to the thin film transistor via the drain electrode.

10. A liquid crystal display, comprising:
    a common electrode;
    a drain electrode disposed on a first substrate;
    a first subpixel electrode disposed within a first region of a pixel of the liquid crystal display;
    a second subpixel electrode disposed in the first region and a second region of the pixel of the liquid crystal display, the second subpixel electrode being directly connected to the drain electrode, the second subpixel electrode comprising an opening in the first region;
    an insulating layer disposed between the first subpixel electrode and the second subpixel electrode; and
    a liquid crystal layer disposed between the common electrode and the first subpixel electrode and between the common electrode and the second subpixel electrode,
    wherein the common electrode and the first subpixel electrode form an electric field in the first region, wherein the common electrode and the second subpixel electrode form an electric field in the first region and the second region, wherein the second subpixel electrode is configured to directly receive a data voltage from a thin film transistor, wherein the first subpixel electrode comprises a connection region where the first subpixel electrode is electrically connected with the second subpixel electrode, the first subpixel electrode being configured to indirectly receive the data voltage from the thin film transistor via the second subpixel electrode, and wherein the connection region is disposed at a central region of the first subpixel electrode, the central region being closer to a center of the first subpixel electrode than edges of the first subpixel electrode.

11. The liquid crystal display of claim 10, wherein:

the second subpixel electrode comprises branch electrodes;

first portions of the branch electrodes are located in the first region;

second portions of the branch electrodes are located in the second region.

12. The liquid crystal display of claim 11, wherein:

the branch electrodes are spaced apart from each other; and the common electrode and the first subpixel electrode forms the electric field in the first region through the opening.

13. The liquid crystal display of claim 11, wherein:

the branch electrodes comprise first branch electrodes and second branch electrodes, the second branch electrodes extending in a direction different from an extending direction of the first branch electrodes.

14. The liquid crystal display of claim 10, wherein:

the first region is located at the center of the pixel; and the first subpixel electrode is not disposed in the second region.

* * * * *